(12) United States Patent
Kumar et al.

(10) Patent No.: US 9,904,697 B2
(45) Date of Patent: Feb. 27, 2018

(54) MANAGING VERSIONS OF CASES

(75) Inventors: Amit Kumar, Houston, TX (US); Sheldon Gorell, Katy, TX (US)

(73) Assignee: Halliburton Energy Services, Houston, TX (US)

( * ) Notice: Subject to any disclaimer, the term of this patent is extended or adjusted under 35 U.S.C. 154(b) by 734 days.

(21) Appl. No.: 14/388,337

(22) PCT Filed: Mar. 28, 2012

(86) PCT No.: PCT/US2012/030911
§ 371 (c)(1),
(2), (4) Date: Sep. 26, 2014

(87) PCT Pub. No.: WO2013/147762
PCT Pub. Date: Oct. 3, 2013

(65) Prior Publication Data
US 2015/0066883 A1  Mar. 5, 2015

(51) Int. Cl.
*G06F 9/44* (2006.01)
*G06F 17/30* (2006.01)
(Continued)

(52) U.S. Cl.
CPC .. *G06F 17/30309* (2013.01); *G06F 17/30554* (2013.01); *G06F 17/30589* (2013.01);
(Continued)

(58) Field of Classification Search
CPC ......... G06F 17/30309; G06F 17/30589; G06F 17/30554; G06F 8/35; G06F 8/75;
(Continued)

(56) References Cited

U.S. PATENT DOCUMENTS 6,002,985 A   12/1999 Stephenson
6,571,251 B1   5/2003 Koski et al.
(Continued)

FOREIGN PATENT DOCUMENTS

RU   2011141865 A   4/2013

OTHER PUBLICATIONS

John F. Roddick et al., A Unifying Semantic Distance Model for Determining the Similarity of Attributes Values, 2003, retrieved online on Sep. 14, 2017, Australian Computer Society Inc., pp. 1-8. Retrieved from the Internet: <URL: http://delivery.acm.org/10.1145/790000/783120/p111-roddick.pdf?>.*
(Continued)

*Primary Examiner* — Hanh T Bui
(74) *Attorney, Agent, or Firm* — Howard L. Speight, PLLC

(57) ABSTRACT

A computer system records a plurality of cases. Each case is used with a software system. The version of the software system is the same for each case. Each case includes a set of input data. Each case includes an identification of a parent case from which input data in the case was copied unless the case is an original case. The identification of the parent case creates a parent/child relationship between the case and the parent case. The computer system creates a hierarchy of the parent/child relationships among the plurality of cases. The computer system displays a subset of the plurality of cases in response to a search of the plurality of cases. A smaller subset of the plurality of cases is selected as a chosen model for an environment in which an activity is to be performed.

16 Claims, 16 Drawing Sheets

(51) Int. Cl.
  *G06Q 10/06* (2012.01)
  *G06F 9/445* (2018.01)
(52) U.S. Cl.
  CPC .............. *G06Q 10/06* (2013.01); *G06F 8/00* (2013.01); *G06F 8/35* (2013.01); *G06F 8/75* (2013.01); *G06F 9/44536* (2013.01); *G06F 17/30958* (2013.01)
(58) Field of Classification Search
  CPC .. G06F 8/00; G06F 9/44536; G06F 17/30958; G06Q 10/06
  See application file for complete search history.

(56) References Cited

U.S. PATENT DOCUMENTS

| | | | |
|---|---|---|---|
| 6,704,719 | B1 | 3/2004 | Ericson |
| 7,096,421 | B2 | 8/2006 | Lou |
| 7,117,411 | B2 | 10/2006 | McNeely et al. |
| 7,587,687 | B2 | 9/2009 | Watanabe et al. |
| 7,953,619 | B2 * | 5/2011 | Heredia .................. G06Q 10/06 705/7.38 |
| 8,756,561 | B2 * | 6/2014 | Petersen .................... G06F 8/10 717/104 |
| 2003/0097650 | A1 | 5/2003 | Bahrs et al. |
| 2004/0220790 | A1 | 11/2004 | Cullick et al. |
| 2005/0209866 | A1 | 9/2005 | Veeningen et al. |
| 2005/0229159 | A1 | 10/2005 | Haba et al. |
| 2006/0274663 | A1* | 12/2006 | Brethereau ........... H04L 41/069 370/247 |
| 2007/0174795 | A1 | 7/2007 | Lavagno et al. |
| 2010/0229080 | A1 | 9/2010 | Roulland et al. |
| 2010/0235101 | A1 | 9/2010 | Aamodt et al. |
| 2011/0106723 | A1* | 5/2011 | Chipley ................. G06Q 10/06 705/348 |
| 2011/0307281 | A1 | 12/2011 | Creveling et al. |
| 2013/0238399 | A1* | 9/2013 | Chipley ................. G06Q 10/06 705/7.37 |
| 2014/0280336 | A1* | 9/2014 | Glover .............. G06F 17/30011 707/771 |
| 2017/0076207 | A1* | 3/2017 | Chipley ................. G06Q 10/06 |

OTHER PUBLICATIONS

Bryan O'Sullivan, Chapter 1—A Brief History of Revision Control, Definitive Guid, O'Reilly Media, XP55170125, ISBN: 978-0-59-680067-3, pp. 1-4, Jul. 4, 2009.
European Patent Office, European search report, Application No./Patent No. 12872873.0-1958 / 2780797 PCT/US2012030911, which is an EP counterpart to the instant application, Feb. 27, 2015.
Halliburton, Nexus Technical Reference Guide, retrieved from the internet:URL:https://esd.halliburton.com//support/LSM/ResMgmt/NexusVIPDT/Nexus/5000/5000_4/Help/Nexus_Tech_Ref.pdf?searchid=1399908968016, retrieved on Feb. 18, 2015.
Halliburton, Nexus User Guide, Retrieved from the internet: URL:https://esd.halliburton.com//support/LSM/ResMgmt/NexusVIPDT/Nexus/5000/5000_4/Help/Nexus_User_Ref.pdf?searchid=1399908968016, retrieved on Feb. 16, 2015.
Wikipedia: Revision control, XP55170128, retrieved from the internet: URL:http://en.widkipedia.org/w/index.php?title=revisioncontrol&oldid=482075182 on Feb. 17, 2015.
Canadian Intellectual Property Office, Requisition by the Examiner, Application No. 2,862,788, which is a CA counterpart to the instant application, Jul. 8, 2015.
Wikipedia, "Revision control", Internet Article, Retrieved from the Internet at the following url: https://en.wikipedia.org/w/index.php?title+Revision_control&oldid=482075182, Mar. 15, 2015 (Mar. 15, 2015), which is filed herewith.
English translation of Federal Service on Intellectual Property Federal State Budget Institution "Federal Institute of Intellectual Property" (FIIP), Notification of the Results of the Patentability Analysis, Application No. 2014140740/08(066025), which is an RU counterpart to the instant application, dated Dec. 18, 2015.
Federal Government Institution "Federal Institute of Industrial Property of the Federal Service on Industrial Property, Patent and Trade Marks" (FGI FIIP), Search Report, Registration No. 201414074/08(066025), which is an RU counterpart to the instant application, dated Dec. 16, 2015.
Federal Service on Intellectual Property Federal State Budget Institution "Federal Institute of Intellectual Property" (FIIP), Notification of the Results of the Patentability Analysis, Application No. 2014140740/08(066025), which is an RU counterpart to the instant application, dated Dec. 18, 2015. An English translation is provided herewith.
Patent Office of the Cooperation Council for the Arab States of the Gulf, GCC Patent Office, Examination Report, Application No. GC 2013-23860, which is a GCC counterpart to the instant application, dated Jun. 29, 2016.
Federal Service on Intellectual Property (Rospatent), Report on Examination Results, Decision on Grant a Patent for Invention, Application No. 2412-516817RU/7252, which is an RU counterpart of the instant application, dated Jul. 13, 2016.
Translation of Federal Service on Intellectual Property (Rospatent), Report on Examination Results, Decision on Grant a Patent for Invention, Application No. 2412-516817RU/7252, which is an RU counterpart of the instant application, dated Jul. 13, 2016.
Canadian Intellectual Property Office, Requisition by the Examiner, Application No. 2,862,788, Entire Document, which is a CA counterpart to the instant application, dated Sep. 26, 2016.
Instituto Mexicano De La Propiedad Industrial, Direccion Divisional De Patentes, Requisito 2, Su solicitud No. MX/a/2014/008748 de Patente PCT, entire document, which is a MX counterpart to the instant application, Oct. 7, 2016.
European Patent Office, Communication pursuant to Article 94(3) EPC, Application No. 12 872 873.0-1958, which is an EP counterpart to the instant application, dated Jan. 1, 2017.
Fon Silvers: "Building and Maintaining a Data Warehouse", Mar. 18, 2008 (Mar. 18, 2008), Auerback Publications, Boca Raton, Fla, XP055329517, ISBN: 978-1-4665-4324-9 pp. 115-118.
Wikipedia: "Document management system", Internet Article, Mar. 19, 2012 (Mar. 19, 2012), XP055329387, Retrieved from the Internet: URL :http://en.wikipedia.org/w/index.php?title=Document_management_system&oldid=482691983 [retrieved on Dec. 15, 2016].
Wikipedia: "Enterprise content management", Internet Article, Mar. 15, 2012 (Mar. 15, 2012), XP055329430, Retrieved from the Internet: URL:https://en.widipedia.org/w/index.php?title=Enterprise_content_managment&oldid=481947974 [retrieved on Dec. 15, 2016].
Wikipedia: "Linked list", Internet Article, Mar. 21, 2012 (Mar. 21, 2012), XP055329513, Retrieved from the internet: URL:https://en.wikipedia.org/w/index.php?title=Linked_list&oldid=483080096 [retrieved on Dec. 15, 2016].
Engineering Database Platform for Piping Design and Stress Analysis, Dong Jailing et al, Journal of Computer-aided design & Computer Graphics, vol. 14, No. 6, 582-585, Jun. 30, 2002.
Instituto Mexicano De La Propiedad Industrial, Direccion Divisional De Patentes, MX Substantive Examination Report, Application No. MX/a/2014/008748, which is an MX counterpart to the instant application, dated Mar. 9, 2016.
Research on Complex Product Design Data Management Based on a Netted Version Model, Feng Guo-qi et al, Journal of Industrial Engineering Management, vol. 23, No. 1, 82-87, Jan. 31, 2009.
The State Intellectual Property Office of the People's Republic of China, The First Office Action, Application or Patent No. 201280071025.X, which is a CN counterpart to the instant application, dated May 4, 2016.
Translation of the State Intellectual Property Office of the People's Republic of China, The First Office Action, Application or Patent No. 201280071025.X, which is a CN counterpart to the instant application, dated May 4, 2016.

\* cited by examiner

Reservoir
- Reservoir length: 2000 feet
- Reservoir width: 2000 feet
- Reservoir area: 91.83 %
- Reservoir thickness: 250 feet
- Depth to top of reservoir: 3900 feet
- Reservoir porosity: 2 %
- Reservoir permeability: 6E-05 md
- Pressure to top of reservoir: 6000 psi
- Reservoir temperature: 200 °F
- Gas specific gravity: 0.54 (Air=1)
- Irreducible water saturation: 20 %

Advanced Properties
- Standard Temperature: 60 °F
- Standard pressure: 14.7 psi
- Rock compressibility: 3E-06 1/psi
- Reference pressure: 4000 psi
- Density of water: 63.1 lb/cu.feet
- Water compressibility: 3E-06 1/psi
- Water viscosity: 0.7 cp
- Water formation volume factor: 1.003 rb/stb
- Reference pressure for water compressibility: 6000 psia

— 305

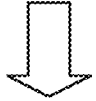

```
GASWATER SPECG 0.54
GAS
    PRES      BG       VG
15000.000  0.38827  0.04036         7507.400  0.52542  0.02850
14500.500  0.39362  0.03970         7007.800  0.54679  0.02751
14001.000  0.39896  0.03903         6508.300  0.57173  0.02649
13501.500  0.40430  0.03834         6008.800  0.60022  0.02543
13002.000  0.40965  0.03764         5509.300  0.63584  0.02435
12502.500  0.41499  0.03692         5009.800  0.68037  0.02324
12002.900  0.42212  0.03618         4510.300  0.73558  0.02210
11503.400  0.42924  0.03542         4010.800  0.80683  0.02096
11003.900  0.43814  0.03465         3511.300  0.90301  0.01982
10504.400  0.44705  0.03385         3011.800  1.03837  0.01870
10004.900  0.45596  0.03302         2512.200  1.23250  0.01762
 9505.400  0.46664  0.03217         2012.700  1.53707  0.01661
 9005.900  0.47911  0.03130         1513.200  2.05892  0.01571
 8506.400  0.49336  0.03040         1013.700  3.12045  0.01494
 8006.900  0.50761  0.02947          514.200  6.28542  0.01433
                                      14.700 225.92950 0.01395
```

FIG. 3

Reservoir
| | | |
|---|---|---|
| Reservoir length: | 2000 | feet |
| Reservoir width: | 2000 | feet |
| Reservoir area: | 91.83 | % |
| Reservoir thickness: | 250 | feet |
| Depth to top of reservoir: | 3900 | feet |
| Reservoir porosity: | 2 | % |
| Reservoir permeability: | 6E-05 | md |
| Pressure to top of reservoir: | 6000 | psi |
| Reservoir temperature: | 200 | °F |
| Gas specific gravity: | 0.54 | (Air=1) |
| Irreducible water saturation: | 20 | % |

Advanced Properties
| | | |
|---|---|---|
| Standard Temperature: | 60 | °F |
| Standard pressure: | 14.7 | psi |
| Rock compressibility: | 3E-06 | 1/psi |
| Reference pressure: | 4000 | psi |
| Density of water: | 63.1 | lb/cu.feet |
| Water compressibility: | 3E-06 | 1/psi |
| Water viscosity: | 0.7 | cp |
| Water formation volume factor: | 1.003 | rb/stb |
| Reference pressure for water compressibility: | 6000 | psia |

Fracture
| | | |
|---|---|---|
| Number of fracture stages: | 10 | |
| Fracture spacing: | 150 | feet |
| Fracture half-length: | 500 | feet |
| Fracture width: | .01 | inches |
| Fracture height: | 200 | feet |
| Fracture porosity: | 30 | % |
| Fracture permeability: | 1000 | md |

```
NX NY NZ
14 11 7
LGR
    CARTREF              CARTREF          ARRAYS
FRAC001              FRAC006
    3 3 3 9 1 7          8 8 3 9 1 7      DX XVAR
    35                   35               14*150
    7*5                  7*5
    7*1                  7*1              DY YVAR
    ENDREF               ENDREF           11*200
    CARTREF              CARTREF
FRAC002              FRAC007              DZ ZVAR
    4 4 3 9 1 7          9 9 3 9 1 7      25 5*40 25
    35                   35
    7*5                  7*5              DEPTH DIP
    7*1                  7*1              3900 0 0
    ENDREF               ENDREF
    CARTREF              CARTREF          ARRAYS FRAC002
FRAC003              FRAC008
    5 5 3 9 1 7          10 10 3 9 1 7    DX XVAR
    35                   35               13.038700 10.865600 9.054670
    7*5                  7*5              7.545560 6.287960 5.239970
    7*1                  7*1              4.366640 3.638870 3.032390
    ENDREF               ENDREF           2.526990 2.105830 1.754860
    CARTREF              CARTREF          1.462380 1.218650 1.015540
FRAC004              FRAC009              0.846284 0.705237 0.587698
    6 6 3 9 1 7          11 11 3 9 1 7    0.705237 0.846284 1.015540
    35                   35               1.218650 1.462380 1.754860
    7*5                  7*5              2.105830 2.526990 3.032390
    7*1                  7*1              3.638870 4.366640 5.239970
    ENDREF               ENDREF           6.287960 7.545560 9.054670
    CARTREF              CARTREF          10.865600 13.038700
FRAC005              FRAC010
    7 7 3 9 1 7          12 12 3 9 1 7    ARRAYS FRAC003
    35                   35               DX XVAR
    7*5                  7*5              13.038700 10.865600 9.054670
    7*1                  7*1              7.545560 6.287960 5.239970
    ENDREF               ENDREF           4.366640 3.638870 3.032390
                         ENDLGR           2.526990 2.105830 1.754860
                                          1.462380 1.218650 1.015540
                                          0.846284 0.705237 0.587698
                                          0.705237 0.846284 1.015540
                                          1.218650 1.462380 1.754860
                                          2.105830 2.526990 3.032390
                                          3.638870 4.366640 5.239970
                                          6.287960 7.545560 9.054670
          FIG. 4B                         10.865600 13.038700
```

| Well | | |
|---|---|---|
| Well lateral length: | 1500 | feet |
| Well location: | InCenter | |
| Well orientation: | EastWest | |
| Wellhead pressure (min): | 1000 | psi |
| Gas production rate (max): | 1000 | MScf/day |
| Advanced Properties | | |
| Well casing internal diameter: | 4.4 | inches |
| Flow-in-pipe correlation: | Beggs | |
| Wellhead depth: | 0 | feet |

⇓

```
WELLSPEC WELL1
IW JW L   GRID    KH    RADW   SKIN RADB WI    MD
18 18 4 FRAC001 8.333000 0.1830 0.0000  NA NA 4025.0000
18 18 4 FRAC002 8.333000 0.1830 0.0000  NA NA 4175.0000
18 18 4 FRAC003 8.333000 0.1830 0.0000  NA NA 4325.0000
18 18 4 FRAC004 8.333000 0.1830 0.0000  NA NA 4475.0000
18 18 4 FRAC005 8.333000 0.1830 0.0000  NA NA 4625.0000
18 18 4 FRAC006 8.333000 0.1830 0.0000  NA NA 4775.0000
18 18 4 FRAC007 8.333000 0.1830 0.0000  NA NA 4925.0000
18 18 4 FRAC008 8.333000 0.1830 0.0000  NA NA 5075.0000
18 18 4 FRAC009 8.333000 0.1830 0.0000  NA NA 5225.0000
18 18 4 FRAC010 8.333000 0.1830 0.0000  NA NA 5375.0000
```

*FIG. 5*

| Tracking Cases — 705 | Searching for a case — 710 | Categorizing cases — 715 | Support for external files — 720 | Hierarchy view — 725 |
|---|---|---|---|---|
| • When created<br>• How relate to previous cases<br>  • Same field/well?<br>  • How do inputs differ?<br>  • How do results differ?<br>  • Comparing two or more cases<br>    • Inputs<br>    • Outputs | • Geographical location<br>• Well/reservoir modeled<br>• Ranges of properties<br>• Cases related to a particular case<br>• Cases similar to a particular case | • User-defined "folders"<br>• Favorites<br>• Automatic "folders" by dates/similarity | • "clipping from OS" to goodie boxes<br>• Drag-drop from goodie boxes to specific case(s)<br>• User-defined meta data for external files once associate to a case | • Relationships of cases<br>• Allow filtering the cases based on categories<br>• Easily pick cases for comparison |

FIG. 7

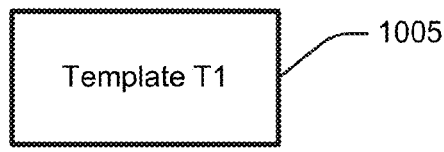
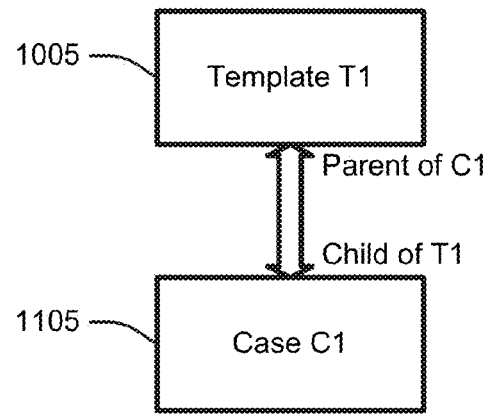
FIG. 10
FIG. 11
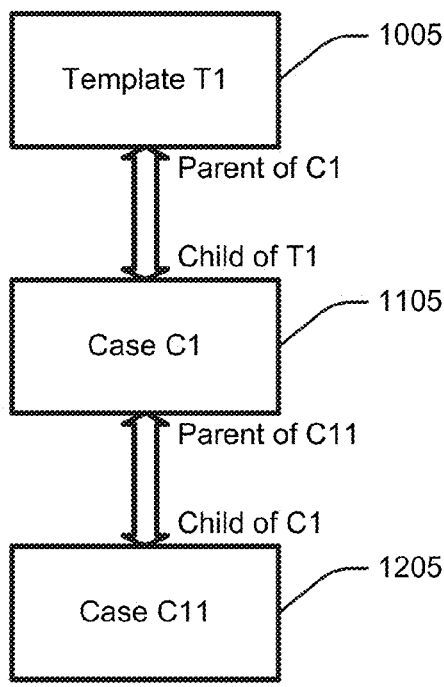
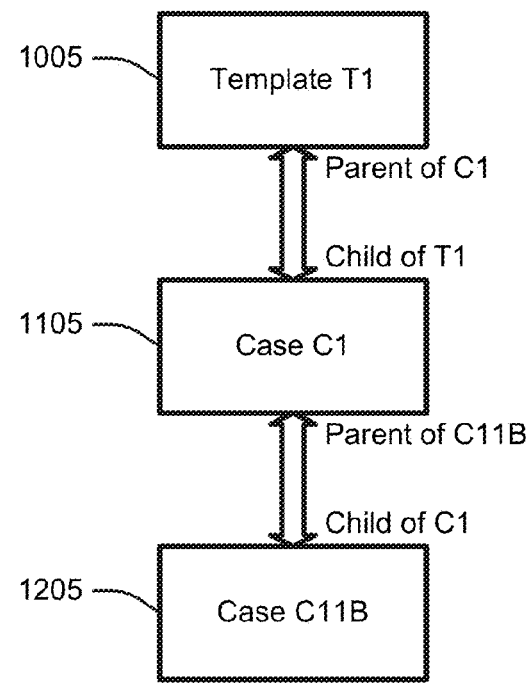
FIG. 12
FIG. 13

| Name | Parent |
|------|--------|
| T1 | Null |
| C1 | T1 |
| C11B | C1 |
| C12 | C1 |

| Name | Parent |
|------|--------|
| T1   | Null   |
| C1   | T1     |
| C11B | C1     |
| C12  | C1     |
| C11C | C11B   |
| C13  | C1     |
| C13A | C13    |

MANAGING VERSIONS OF CASES

BACKGROUND

Users of complex technical software systems, such as those used to model petroleum systems, often create several cases or scenarios to account for uncertainty in known input parameters for the software system or to try different versions of the input parameter variations in a "what-if" analysis. Often, the software systems operate on the case input data and produce output data. Managing the resulting case versions and resulting output data can be challenging.

BRIEF DESCRIPTION OF THE DRAWINGS

FIGS. 3, 4A, 4B, 5, and 6 illustrate the operation of an intelligent translation layer.

FIG. 7 illustrates features of the system for creating and managing cases.

FIGS. 10-14 and 16 illustrate a hierarchy among cases.

FIGS. 15 and 17 illustrate the hierarchy among cases in the name and parent fields of a case file record.

DETAILED DESCRIPTION

Figure 1:
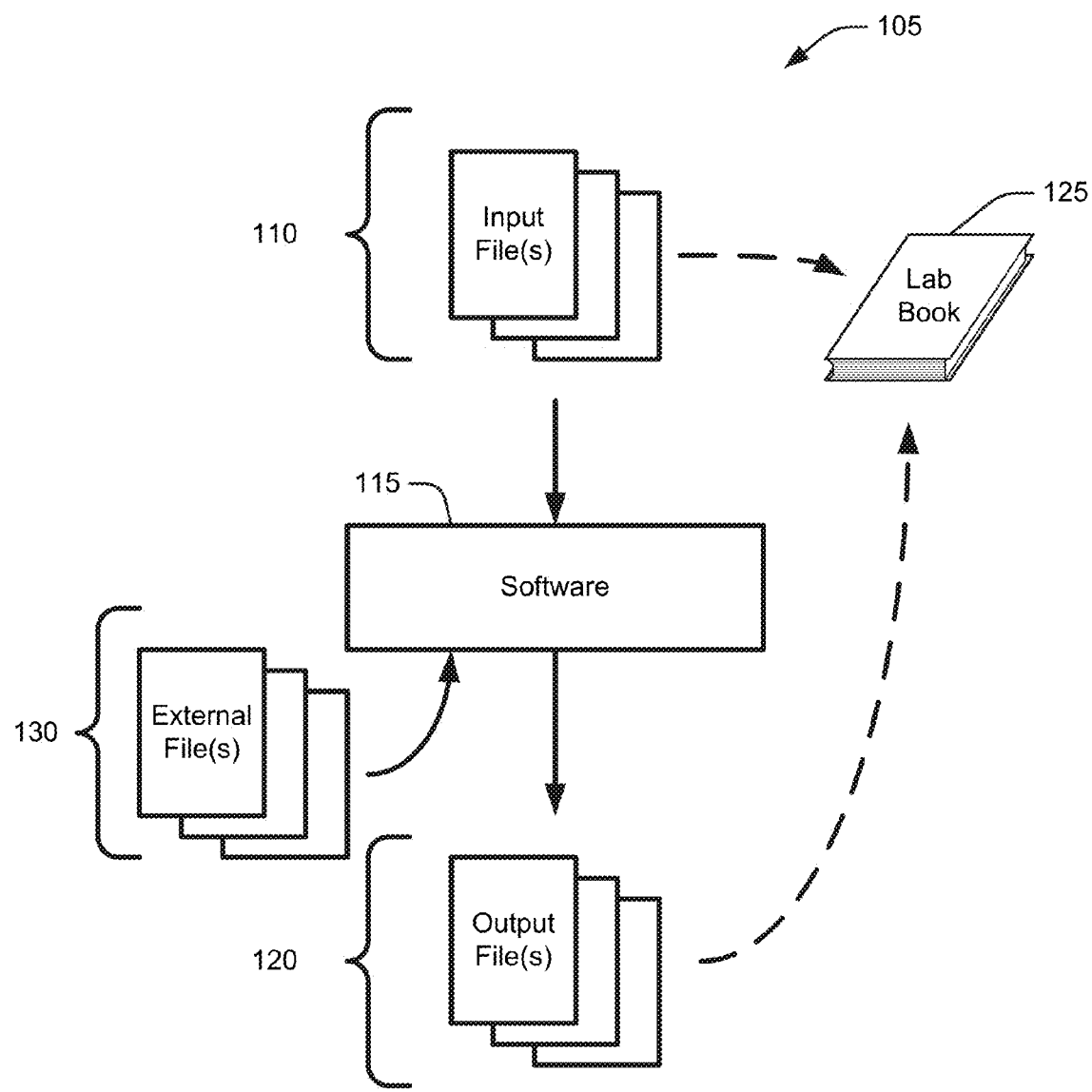
FIG. 1 is an illustration of a prior art method of managing versions of cases.

A prior art method 105 for managing versions of cases, illustrated in FIG. 1, involves the identification of a case. A "case" is defined to be a set of input data, such as input file(s) 110, used to stimulate a simulator, such as software 115, which produces an output, such as output file(s) 120. Some software allows the user of the software to type in notes or comments about a case that is visible when the user opens the case for analysis at a later time. Some software, such as the NEXUS® Reservoir Simulation Software provided by the assignee of the present application, allow users to manually create a hierarchical system of cases. A user tracks the relationship between cases (i.e., case B created by copying case A) and changes in cases (i.e., the reservoir temperature is changed to 200 degrees C.) by writing such information in a laboratory notebook 125.

It would be useful to search among the cases, each of which may have multiple variations, related to multiple different projects stored in the laboratory notebook 125. Further, it would be useful to be able to categorize cases using the particulars of the cases stored in the laboratory notebook 125. For example, a user may want to see the cases or scenarios (i.e., sets of linked cases) that he/she worked on in the last six months that have been edited in the last five weeks. Still further, the software 115 may have used one or more external computer files 130 in processing a case. For example, the user may receive a spreadsheet, an image file, or another type of document that contains data or information relevant to a case or scenario. A user may find it useful to know what external file(s) 130 were used in processing a case or scenario. A user may further find it useful to store a copy of the external file(s) 130 so that the processing of the case or scenario can be reproduced accurately.

Figure 2:
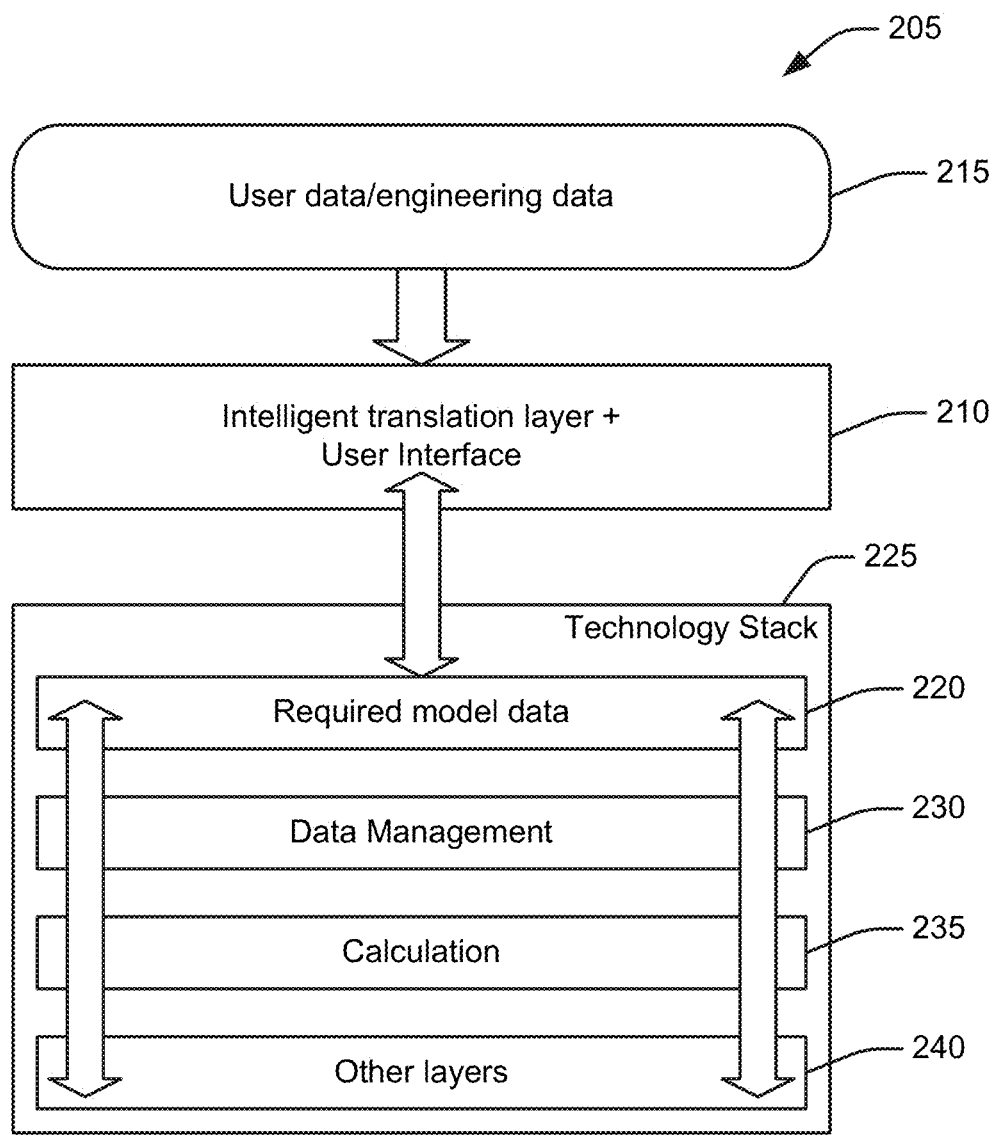
FIG. 2 is an illustration of a system for creating and managing cases.

One embodiment of a system 205 for creating and managing cases and scenarios is shown in FIG. 2. Hereafter, the specification will discuss creating and managing cases. It will be understood that creating and managing scenarios uses similar techniques.

In one embodiment, the system 205 includes an intelligent translation layer 210, which accepts "user data" and/or "engineering data" 215 through a user interface and transforms it, through format changes, calculations, rearrangement, and/or similar operations into a form that matches an input specification of the software 115 (i.e., required model data 220 that is part of a technology stack 225).

In one embodiment, a data management layer 230 creates and manages cases, as discussed in more detail below. In one embodiment, a calculation layer 235 performs the calculations of, for example, a model using the software 115. In one embodiment, other layers 240 perform other functions, such as displaying the model data on attached monitors, communicating with other systems over networks such as a local area network or the Internet, printing model data, and other similar functions.

Examples of the operation of one embodiment of the intelligent translation layer 210 are shown in FIGS. 3, 4A, 4B, and 5. The intelligent translation layer 210 allows the user of the system 205 to enter "user data" and/or engineering data 215 using parameters and units that are familiar to the user. For example, in one embodiment shown in FIG. 3, a user has entered parameters into a screen 305 that is displayed on a computer monitor and is manipulated using a computer and its peripherals, such as a keyboard, mouse, graphics tablet, etc. These parameters, such as reservoir length, reservoir width, etc., are familiar to the geologists and petroleum engineers likely to use such a system. In one embodiment, the intelligent translation layer 210 takes the values of the reservoir temperature and gas specific gravity parameters entered by the user, as highlighted by the dashed box on the screen 305, and computes the data in the output pressure-volume-temperature ("PVT") file shown at the bottom of FIG. 3, which is data useful to the software 115.

Similarly, in one embodiment, the intelligent translation layer 210 accepts the user's entry of reservoir length, reservoir width, reservoir area, and reservoir thickness, shown highlighted by the top dashed box in FIG. 4A, and the number of fracture stages, fracture spacing, fracture half-length, fracture width, and fracture height indicated by the bottom dashed box in FIG. 4A, all of which are familiar parameters to geologists and petroleum engineers, and calculates a grid file, as shown in FIG. 4B, which is data useful to the software 115.

Similarly, in one embodiment, the intelligent translation layer 210 combines the reservoir data shown in FIGS. 3, 4A, and 4B and the well data shown in FIG. 5, in particular the well lateral length, well location, and well orientation highlighted by the dashed box in FIG. 5, and calculates the well file shown at the bottom of FIG. 5, which is data useful to the software 115.

Figure 6:

In one embodiment, the end result of the user's entry of "user data" and "engineering data," as shown in FIG. 6, is an auto-generated locally refilled grid based on fracture data.

In one embodiment, the data management layer 230 manages the creation of a case by providing the user with a screen through which a case name can be entered. In one embodiment, the "user data" and/or "engineering data"

entered into data entry fields, such as those shown in FIGS. 3, 4A, and 5, when the case is created are associated with the case name. In one embodiment, the data associated with the case name are the "user data" and/or "engineering data" 215. In one embodiment, the data associated with the case name are the required model data 220. In one embodiment, the data associated with the case name include the "user data" and/or "engineering data" 215 and the required model data 220.

In one embodiment, as part of the user interface the system 205 offers to create a name for the case being created, using, for example, a time stamp calculated from the current time, local or otherwise, when the case was created.

In one embodiment, the data management layer 230 tracks the state of the set of input values for a case. The data management layer 230 is not a software development version management system for managing, for example, the development of software 115. The purpose of the data management system is to manage the creation and evolution of cases.

Generally, as shown in FIG. 7, the data management layer 230 provides several features. The data management layer 230 tracks cases 705. In one embodiment, the data management layer 230 tracks the data and time that cases are created by, for example, storing a time stamp reflecting the creating date and time when the case is created.

In one embodiment, the data management layer 230 tracks the relationship of cases to each other in terms of, for example, whether the cases are associated with the same field or well, the differences in the input data, and differences in the output data. In one embodiment, the data management layer 230 performs this function by storing data relevant to these comparison points with each case and providing tools, such as database query engines or the like, to enable comparisons of the data between cases.

In one embodiment, the data management layer 230 allows a user to search for a case 710 using, for example, geographic location, and/or the well or reservoir being modeled, by specifying a range of case parameter values, by identifying a case and requesting "related" cases (where, in one embodiment, "related" refers to the parent/child or sibling relationships discussed below), or by identifying a case and requesting "similar" cases (where, in one embodiment, "similar" refers to affinity between cases as discussed below). In one embodiment, the data management layer 230 performs this function by storing data relevant to these search points with each case and providing tools, such as database query engines or the like, to enable searching of the cases.

In one embodiment, the data management layer 230 allows a user to categorize cases 715. In one embodiment, the cases can be categorized into user-defined "folders," which may or may not correspond to operating system folders, such as by geographic location, well site, geological parameter value, or some other category. In one embodiment, the data management layer 230 allows a user to identify "favorite" cases that, for example, the user has found useful or seminal in the creation of other cases. In one embodiment, the data management layer 230 automatically creates "folders," which may or may not correspond to operating system folders, that contain cases related by date, geographical region, or some other similarity. In one embodiment, the creation of such automatic folders can be specified by a user through a "preferences" interface.

In one embodiment, the data management layer 230 provides support for external files 720. In one embodiment, this includes clipping data or files from the operating system (e.g., from a listing of files in a directory, a store, or a cloud location) and storing it in a "goodie box," which is a folder or other file organization technique that holds data files and other materials that a user has found useful. In one embodiment, the data management layer 230 allows materials from the goodie box to be dragged and dropped, or copied, and associated with a case or cases. In one embodiment, the data management layer 230 allows user-defined metadata, such as comments, sources, revision history, usefulness in testing, etc., to be associated with an external file one it is associated with a case. In one embodiment, the metadata includes a "user rating" that reflects the usefulness of a case, the degree to which a case has been used, or another similar metric. For example, a user may use a rating of one to five stars. In one embodiment, a rating of five stars indicates that the case is very useful or of very high quality and might be assigned to a case that has been presented to a client or to management. In one embodiment, a rating of one star indicates that the case is of low quality in the view of the user. In one embodiment, the "user rating" can be used as a search parameter in locating cases. An example of one embodiment of such a search is "search for all cases that are 4-star and higher with wells of lateral lengths between 1500 feet and 3000 feet, drilled in reservoirs with top depth exceeding 6000 feet." In one embodiment, the output of such a search would be limited to cases in which the "user rating" is four or more stars.

In one embodiment, the data management layer 230 provides a hierarchical view of the cases 725. In one embodiment, such a view includes the parent/child or sibling relationship of the cases, as discussed in more detail below. In one embodiment, such a view presents cases in context of their origin how they propagate to offspring and siblings and, as described below, how they are different from parents, offspring, and children. In one embodiment, the data management layer 230 allows filtering of the viewed cases based, for example, on the categories discussed above. In one embodiment, the data management layer 230 allows selection for comparison of cases displayed in the hierarchical view by, for example, sequentially right-clicking on the displayed cases to be compared. In one embodiment, once the cases to be compared are selected, a "compare" button on the screen can be pressed or clicked and a comparison of the cases will be provided.

In one embodiment, the data management layer provides a template chosen from several default templates, a blank template, and custom templates, that include data entry points for the "user data" and/or "engineering data" 215. The screens in FIGS. 3, 4A, and 5 illustrate several example templates. In one embodiment, the data in the chosen template can be edited as desired by the user, saved as a case, and calculations to required model data 220 will be performed on that data.

In one embodiment, the data management layer 230 allows a case to be "checked in" and "checked out." In one embodiment, when a case is "checked out," a user can modify the "user data" and/or "engineering data" 215 associate with that case. In one embodiment, when a case is "checked in," the "user data" and/or "engineering data" 215 associated with that case is locked and cannot be modified. In one embodiment, the data management layer 230 stores data regarding a case when it is "checked in" after being "checked out." In one embodiment, the data management layer 230 stores data regarding a case periodically, i.e., every 10 minutes or every hour, when the case is "checked out." In one embodiment, the data management layer 230 stores data regarding a case whenever a change regarding that case occurs, such as when a change to one of the parameters shown in FIGS. 3, 4A, and 5 is made.

In one embodiment, the data management layer 230 manages a set of users and the privileges accorded to each of the users concerning whether or not a particular user has the privilege to "check out" a case, to copy a case, or to perform other operations relative to the case.

In one embodiment, the input data associated with a case is maintained by the data management layer 230 in a persistent manner, for example by saving a data structure associated with the case to a hard drive, even as it is copied, edited, renamed, or deleted, and maintains the hierarchical representation of the cases based on child, parent, and sibling relationships, as discussed below.

Figure 8:
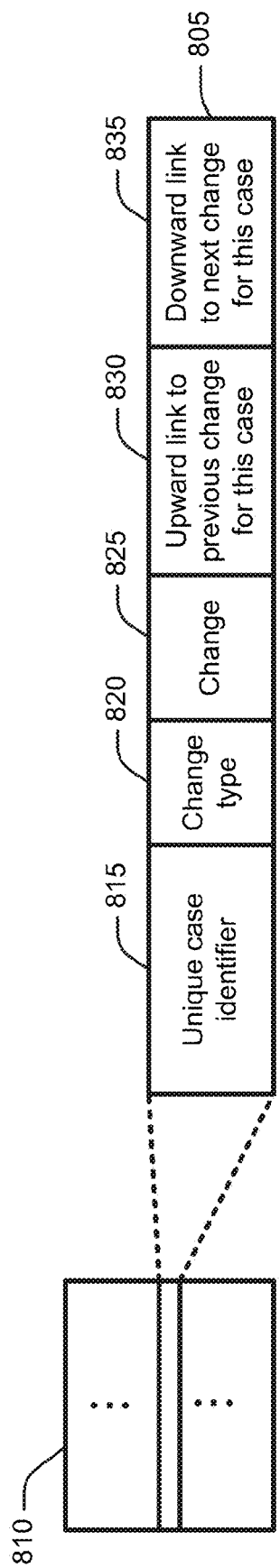
FIG. 8 illustrates a change file and one record of the change file.

In one embodiment, the change data for each case is stored in a separate file. In one embodiment, the changes made to create the case from its parent are kept in one file and the changes made to the case after its creation are kept in another file. In one embodiment, all of the changes to a case are kept in a single file. In one embodiment, the changes made to all cases are kept in a single file, with the revisions being organized in a linked list, such as that shown in FIG. 8. FIG. 8 shows one change file record 805 of a linked-list change file 810. In one embodiment, the record 805 includes a unique case identifier field 815, which may be different from the case name established by the user. In one embodiment, the unique case identifier field 815 includes a time stamp associated with the date and time the case was created.

In one embodiment, the change file record 805 includes a change type field 820. In one embodiment, the change type field 820 has one value (e.g., "original" or "o") if the change reflects a change from the parent case when the case was created and another value (e.g., "revision" or "r") if the change reflects a change to the case made after the case was created. In one embodiment, the change type field 820 includes a time stamp for when the change was made.

In one embodiment, the change file record 805 includes a change field 825 that contains the change made. For example, in one embodiment the change field 825 includes an identifier of the field being changed (i.e., "reservoir length," or a code representing that field). In one embodiment, the change field 825 includes the old value of the field being changed. In one embodiment, the change field 825 includes the new value of the field being changed.

In one embodiment, the record 805 includes an upward link to the previous change for this case 830. In one embodiment, the upward link 830 is a pointer to another record in the change file 810. In one embodiment, the upward link is a pointer to a record in another file.

In one embodiment, the record 805 includes a downward link to the next change for this case 835. In one embodiment, the downward link 835 is a pointer to another record in the change file 810. In one embodiment, the downward link 835 is a pointer to a record in another file.

In one embodiment, the data management layer 230 maintains the change file 810.

Figure 9:
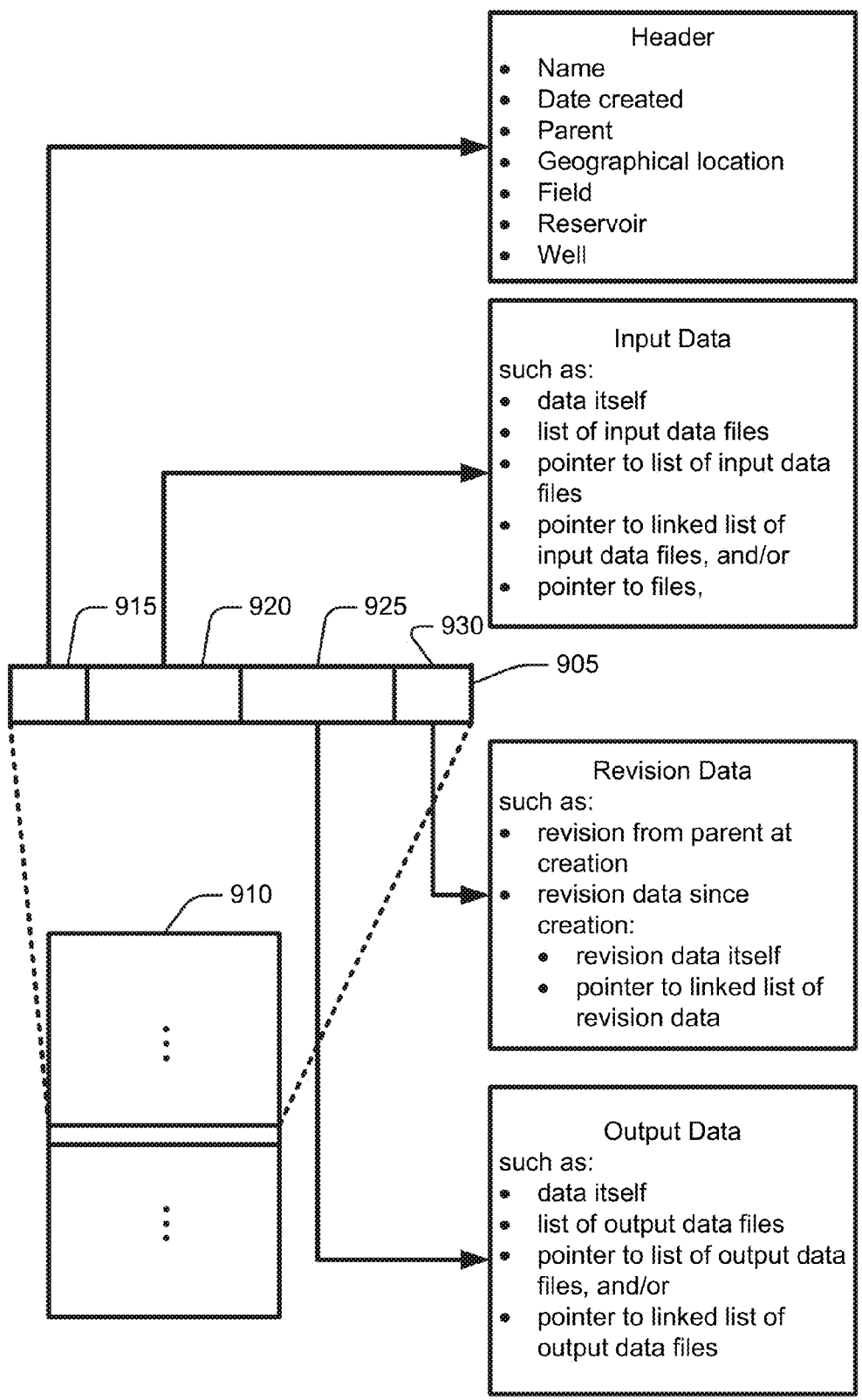
FIG. 9 illustrates a case file and one record of the case file.

In one embodiment, the data management layer 230 maintains a case record 905, such as the case record 905 shown in FIG. 9, for each case. In one embodiment, the case records 905 for all cases are stored in a case file 910. In one embodiment, the case record 905 includes one or more header fields 915. In one embodiment, the header field 915 includes the name of the case, which may be the unique case identifies discussed in connection with FIG. 8, the date the case was created, the parent of the case (described below), the geographical location associated with the case, and the field, reservoir, and/or well associated with the case.

In one embodiment, the case record 905 includes one or more input data fields 920. In one embodiment, the input data fields 920 include the input data itself, a list of input data files, a pointer to a list of input data files, pointer to linked list of input data files, and/or a pointer to files, which, in one embodiment, are external files, such as external file(s) 130, associated with the case.

In one embodiment, the case record 905 includes one or more output data fields 925. In one embodiment, the output data fields 925 include the output data itself, a list of data output files, a pointer to a list of output data files, and/or a pointer to a linked list of output data files.

In one embodiment, the case record 905 includes one or more revision data fields 930. In one embodiment, the revision data field 930 includes a field containing a revision from the parent at creation, a field containing a revision data since creation, including the revision data itself and/or a pointer to a linked list of the revision data. In one embodiment, the revisions to the cases are recorded using records similar to record 805 shown in FIG. 8.

In one embodiment, the data management layer 230 maintains a hierarchical relationship among the cases. For example, in one embodiment, a template T1 1005, shown in FIG. 10, is available as a starting point for building a case. In one embodiment, a case Case C1 1105 is created from the Template T1 1005. In one embodiment, the data management layer 230 records Case C1 1105 as a child of Template T1 1005 and Template T1 1005 as the parent of Case C1 1105. In one embodiment, the differences between Template T1 1005 and Case C1 1105 are recorded in a change record 805 in a change file 810, such as that shown in FIG. 8, or in the revision data 930 of a case record 905, such as that shown in FIG. 9.

In one embodiment, if a change is made to Case C1 1105, the change is recorded in the associated case record 905 and/or in the change file 810 discussed in connection with FIG. 8, but no changes in the relationships are recorded because none are needed.

In one embodiment, a copy of Case C1 1105 is made to produce Case C11 1205, as shown in FIG. 12. Case C11 1205 is recorded as the child of Case C1 1105 and Case C1 1105 is recorded as the child of Case C11 1205 and any difference between Case C11 1205 and case C1 1105 is recorded in a change record 805 for case C11 1205 in the change file 810 or in the revision data 930 of the case record 905 associated with Case C11 1205.

In one embodiment, the user renames Case C11 1205 as case C11B 1205, as shown in FIG. 13. In one embodiment, the name change is recorded in the appropriate case record 905 and the relationships are updated; i.e., Case C1 1105 is updated to be the parent of Case C11B 1205 and Case C11B 1205 is updated to be the child of Case C1 1105. In one embodiment, the name change is recorded in the change file 810 and/or in the revision data 930 of the case record 905 for Case C11 1205.

Figures 14, 15:
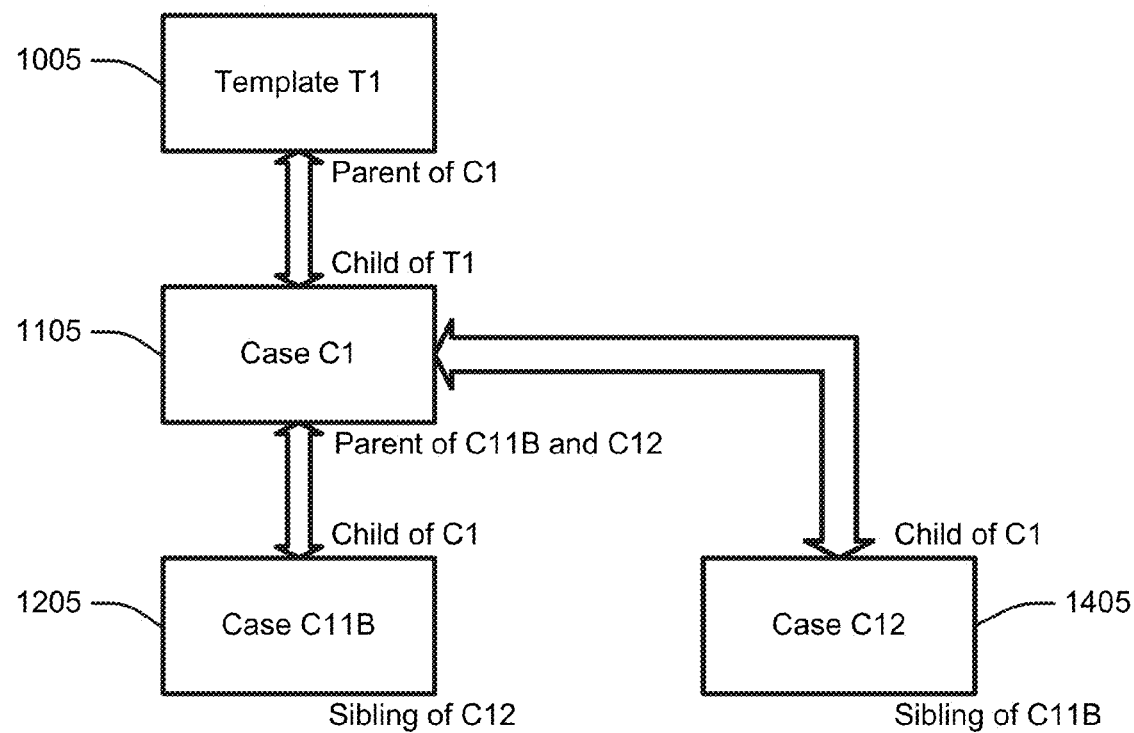

In one embodiment, a copy of Case C1 1105 is made and named Case C12 1405, as shown in FIG. 14. Case C12 1405 is recorded as the child of Case C1 1105 and Case C1 1105 is recorded as the parent of Case C12 1405 and any difference between Case C12 1405 and case C1 1105 is recorded in a change record 805 for case C12 1405 in the change file 810 or in the revision data 930 of the case record 905 associated with Case C12 1405. As can be seen in FIG. 14, Case C11B 1205 is a sibling of Case C12 1405.

In one embodiment, the relationships among the template and cases shown in FIG. 14 are embodied in the "name" and "parent" portions of the header fields 915 in the case records 905 for each of the cases as shown in FIG. 15. In one embodiment, the sibling relationship between Case C11B 1205 and Case C12 1405 is discovered by querying the table shown in FIG. 15 for all cases in which Case C1 1105 is a parent. Alternatively, in one embodiment, a link list of sibling fields, similar to the linked list fields 830 and 835 in the change file 810 shown in FIG. 8, is added to the case record 905 and the sibling relationships can be discovered using those fields.

Figures 16, 17:
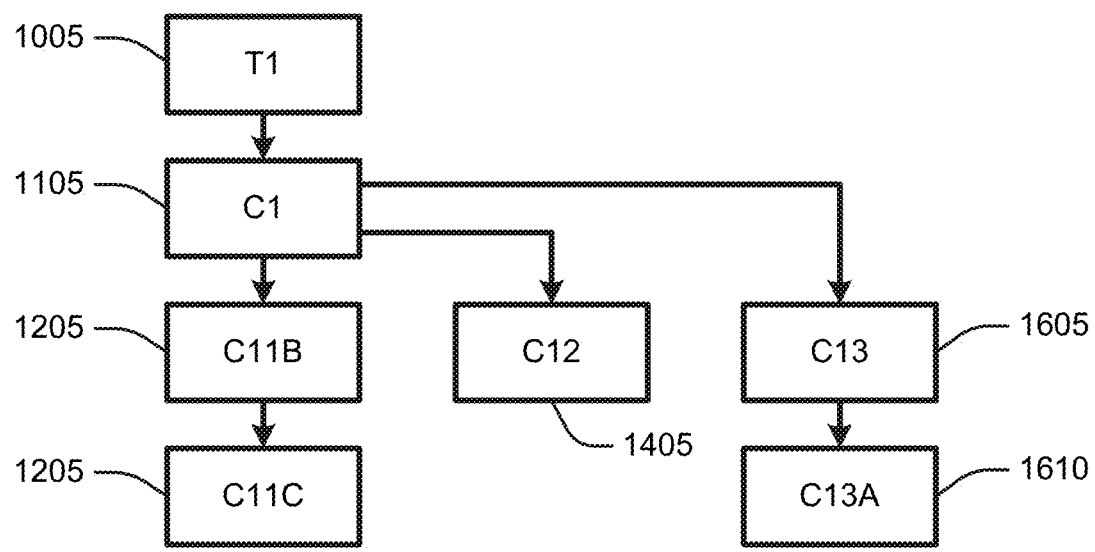

In one embodiment, shown in FIG. 16, Case C11C is added as a child to Case C11B, Case C13 is added as a child to Case C1, and Case C13A is added as a child to Case C13. Case C13 1605 is recorded as the child of Case C1 1105 and Case C1 1105 is recorded as the parent of Case C13 1605 and any difference between Case C13 1605 and case C1 1105 is recorded in a change record 805 for case C13 1605 in the change file 810 or in the revision data 930 of the case record 905 associated with Case C13 1605. Case C13A 1610 is recorded as the child of Case C13 1605 and Case C13 1605 is recorded as the parent of Case C13A 1610 and any difference between Case C13A 1610 and case C13 1605 is recorded in a change record 805 for case C13A 1610 in the change file 810 or in the revision data 930 of the case record 905 associated with Case C13A 1610. The resulting relationship table is shown in FIG. 17.

In one embodiment, the data management layer allows the case file 910 that contains the case records 905 to be searched using any of the available search algorithms to respond to search requests. A search query can be based on one or more criteria, such as the name of the case, the geographical location of the data being modeled, the dates on which the case was created or modified, or any of the fields in the case record 905, or a combination thereof.

Figure 18:
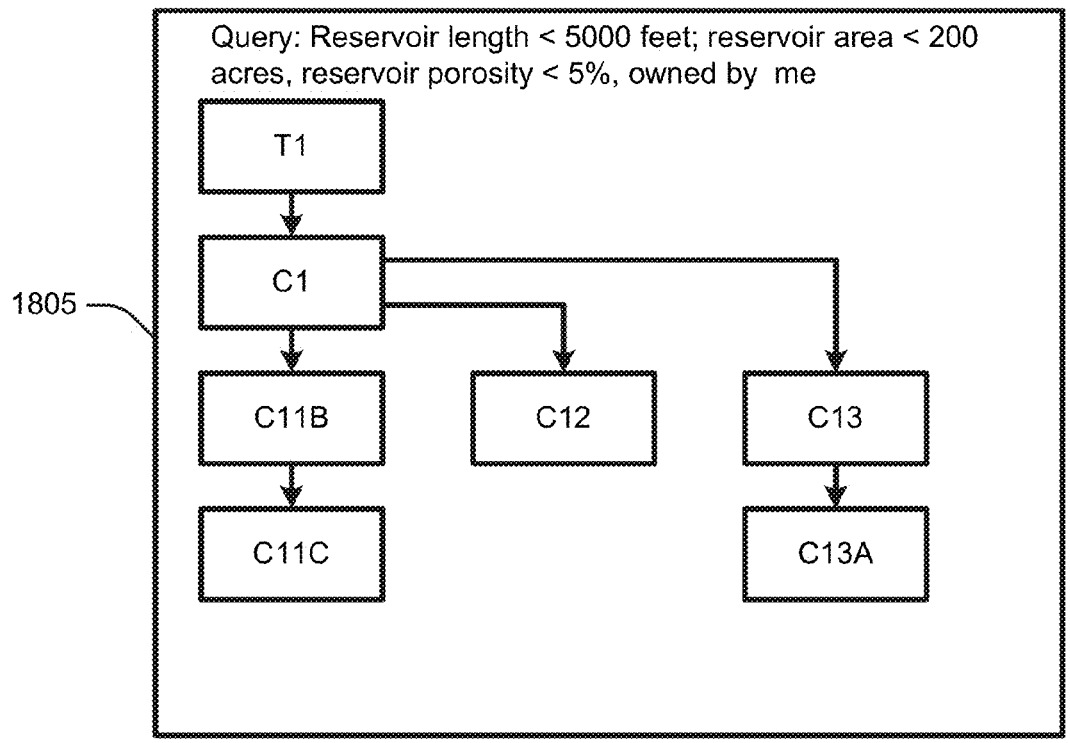
FIG. 18 illustrates the hierarchical result of a search.

For example, FIG. 18 shows a display screen 1805 displaying the result of the following query: "Reservoir length<5000 feet, reservoir area<200 acres, reservoir porosity<5%, owned by me." As can be seen in FIG. 18, in one embodiment, cases that fit the search criteria are displayed and are shown in the hierarchy established as the cases were created.

Figure 19:
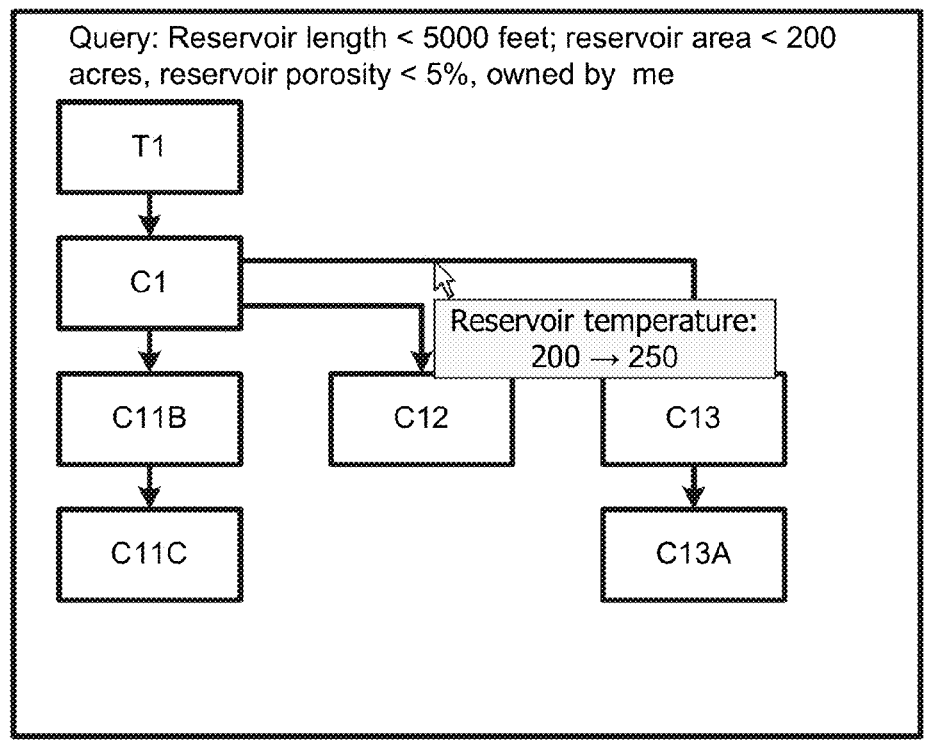
FIG. 19 illustrates displaying changes from a parent case to a child case.

Further, in one embodiment, the differences between the cases can be discovered by for example, hovering the cursor above the line connecting a parent and a child, as shown in FIG. 19. In FIG. 19, the cursor is hovering over the line connecting Case C1 and Case C13 and a pop up window indicates that when Case C13 was created from Case C1, the value of the reservoir temperature parameter was changed from 200 degrees to 250 degrees. In one embodiment, this information is drawn from the case record 905 discussed in connection with FIG. 9 and/or the change file 810 discussed in connection with FIG. 8.

In one embodiment, the changes that have been made to a particular case can be discovered by, for example, double-clicking on the representation of that case on FIG. 18 at which time a pop up window will appear describing the changes that have been made to the case since its creation.

In one embodiment, the output of the software 115 is maintained by the data management layer 230 as discussed above with respect to FIG. 9. In one embodiment, this makes it straightforward to compare the outputs of calculations for two or more cases.

In one embodiment, if a change is made to certain parameters of a parent case, such as Case C11B 1205 (see FIG. 16), the data management layer 230 makes the same change to the same parameter in all of the children cases of that parent case, e.g., Case C11C 1205. For example, if the reservoir length parameter is changed from 1000 feet to 1100 feet in Case C11B 1205, then the same change will be made in Case C11C 1205. In one embodiment, the data management layer 230 asks the user if a change to a parent case should also be made to the children cases. In one embodiment, the data management layer 230 lists or displays the children cases of the parent case being changed and asks which of the children cases should have the same change. In one embodiment, the "certain parameters" do not include parameters such as the name, date created, and parent parameters in the header fields 915 of the case record. In one embodiment, the data management layer tracks such changes in the change file 810 and/or in the revision data 930 of the case record 905 for the affected cases in the case file 910.

In one embodiment, categorization is similarly done by maintaining in the case records 905 records of creation date, modification date, frequency of use of each case, user-entered favorite status, etc. In one embodiment, an affinity score for each pair or group of cases is computed automatically and is a basis for categorizing cases automatically or quickly identifying similar or dissimilar cases automatically.

In one embodiment, an affinity score, signifying the dissimilarity of cases, is estimated for a pair of cases to be a measure of distance between the set of input variables for each cases. In one embodiment, the user is given a choice of distance measures. In one embodiment, the user can choose from any standard distance measure, such as Euclidean distance, Canberra distance, Normalized square Euclidean distance, Bray Curtis distance, and so on or can define a new distance measure. In one embodiment, the user will also be able to choose weights for use in computing the distance measure for each individual input variable that define the case, or for a group of input variables, say the reservoir dimensions, which may include individual input variables, such as length, width, and height for a shoebox-shaped reservoir model.

Figure 20:
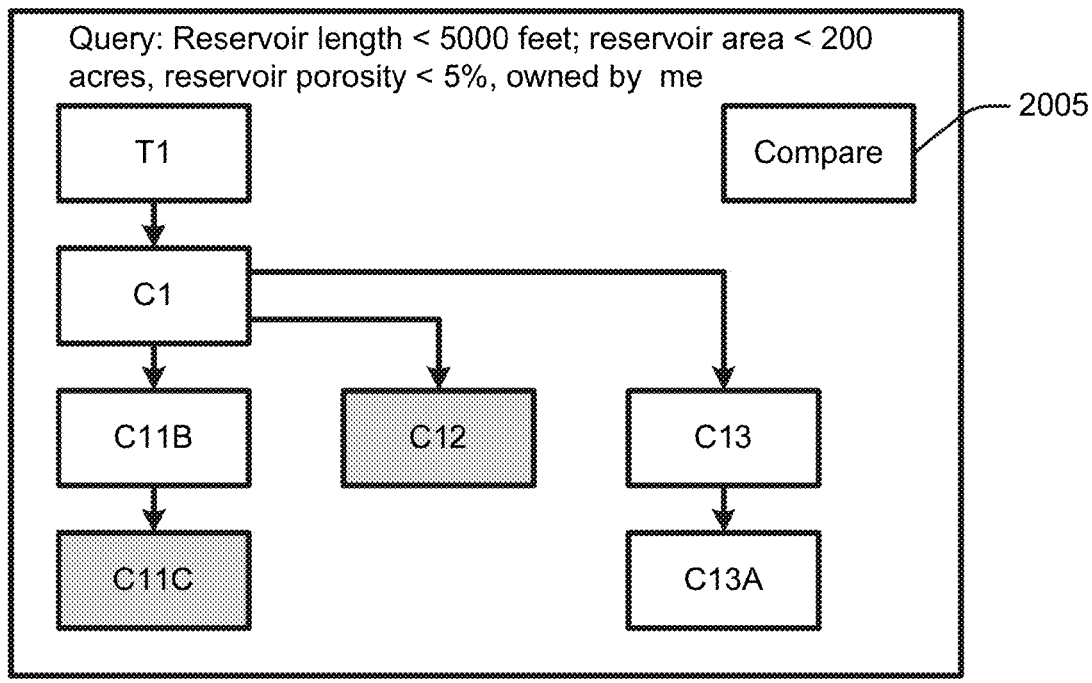
FIG. 20 illustrates selecting cases.
Figure 21:
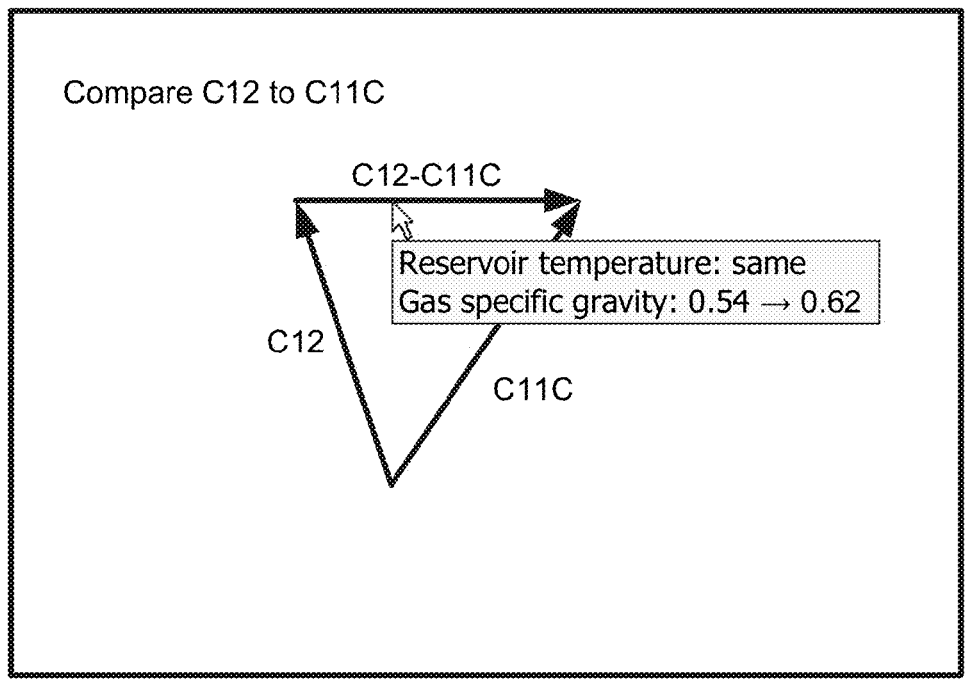
FIG. 21 illustrates a view of the difference between two cases.

One embodiment of a distance calculation is illustrated in FIGS. 20 and 21. In one embodiment illustrated in FIG. 21, the user selects Case C12 and Case C11C by clicking on them, as indicated by the darker shading on the boxes representing those two cases. In one embodiment, a "Compare" button 2005, shown in the upper right corner of FIG. 20, is pressed and a representation of the distance between the two cases appears as shown in FIG. 21. In one embodiment, the two cases are represented as vectors and the distance between them is shown as the vector difference between the two vectors. In one embodiment, the elements of the difference between the two cases can be discovered by, for example, hovering the cursor over the difference vector. In the illustration shown in FIG. 21, only two dimensions are represented: reservoir temperature and gas specific gravity. In the illustration, the pop up indicates that the reservoir gas temperature is the same in the two cases but that the gas specific gravity in Case C12 is 0.54 while the gas specific gravity in Case C11C is 0.62. In one embodiment, the same information is represented in tabular form.

In one embodiment, an affinity score can also computed for three or more cases at once. Again, this score signifies how dissimilar, or "distant," the cases are from each other or from a group of cases or as a quick estimate of how similar or dissimilar two cases or a group of cases are. In one embodiment, the score is quantitative; i.e., it is a number, such as 100 representing identity, or 75, 50, and 25 representing progressively lower degrees of affinity. In one embodiment, the score is qualitative; i.e., the score is represented as a judgment, ranging from "distant" for a very low affinity score, to "very dissimilar," "somewhat dissimilar," "similar," "very similar," and "identical," representing progressively higher degrees of affinity.

In one embodiment, an affinity score between two cases shown in a hierarchical view, such as that in FIG. 19, is displayed in a pop up window such as that shown in FIG. 19 with the text in the pop up window describing the affinity score rather than the difference between the two cases. For example, in one embodiment, the text in the pop up window in FIG. 19 reads "Affinity Score=75," meaning that the affinity between Case C1 and Case C13 has been computed to be 75.

In one embodiment, the distance of a case from a group, or of a group of cases from another group, can be computed as the distance between the centroids of these groups. Again, in one embodiment, the user can choose from various distance measures, such as the ones enumerated earlier, or others that carry more meaningful for a group of points, such as the Mahalanobis distance. In one embodiment, distance computation includes Boolean data (that take only two admissible values or states), or strings, using measures such as Hamming distance, Edit distance, etc. Again, in one embodiment, the user can supply weights to an input variable or a group of input variables, as per his or her preference.

In one embodiment, other views are provided through which a user can view, select, and/or interact with the cases. In one embodiment, the cases are shown in a "list" view, in which the cases are listed along with details about each case. In one embodiment, the amount of detail provided about each case is selectable (i.e., "coarse detail," which excludes some of the less queried details about the cases, to "fine detail," which includes all or most details about the cases). In one embodiment, a folder view is provided in which folders containing cases are shown symbolically (i.e., each folder is represented by a "folder" icon) on a screen. In one embodiment, clicking on or otherwise selecting a folder will produce a display of the contents of the selected folder, which might be an additional folder or folders, a list of the cases assigned to the folder, a list of the cases assigned to the folder with details about each of the cases, or a hierarchical view of the cases in the folder.

In one embodiment, files external to the application can be chosen, even while the application is not running, to be sent to the application to be associated with a particular category (or folder) in the application, or to the application without any specification. In the latter event, in one embodiment, when the application is opened by the user, he/she can select to associate all unassociated external files to one or more cases. In one embodiment, these external files will archived by the application (case management system) and the data structure will maintain links to all the individual external files as they are associated with the cases. As a result, in one embodiment, the user can easily access not only the input data for each case, but if available also the calculation results and associated external files.

Figure 22:
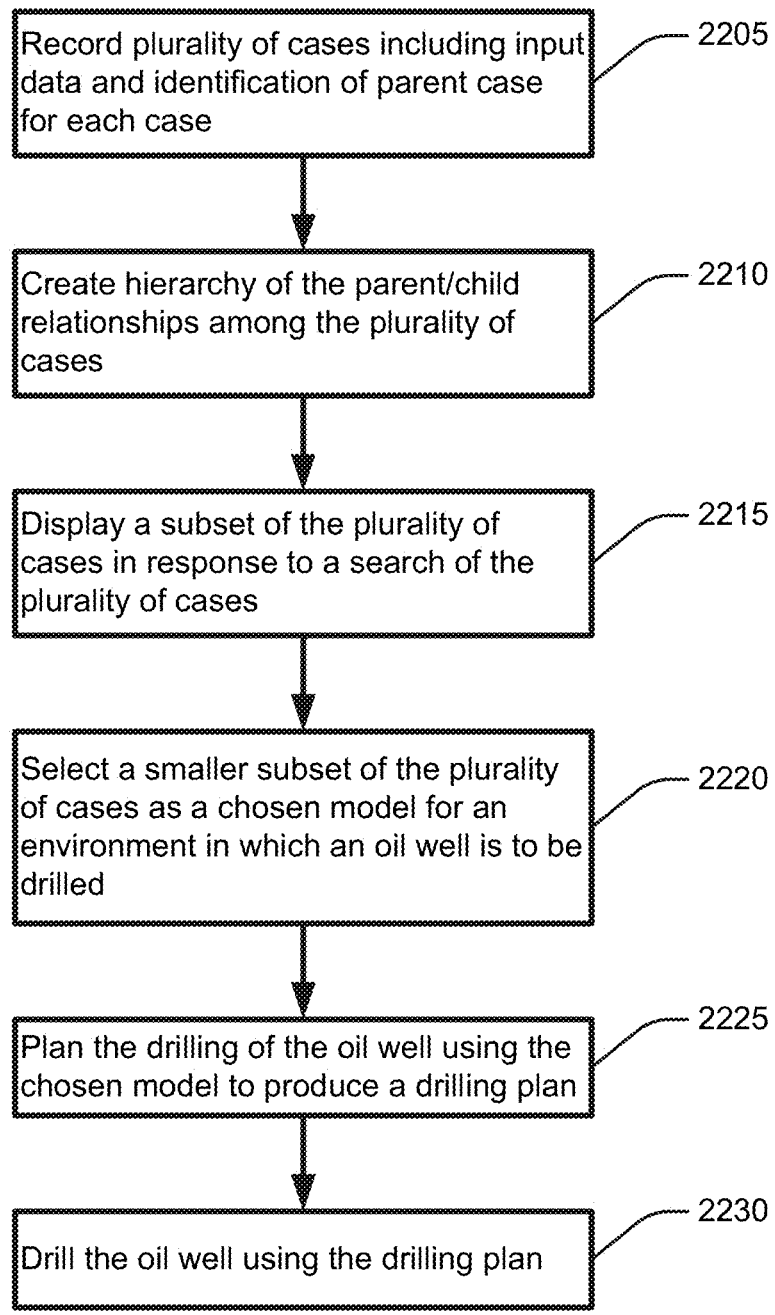
FIG. 22 is a flow chart.

In one embodiment of use, as illustrated in FIG. 22, the data management layer 230 records a plurality of cases, including, for each case, input data and the identification of the parent case unless the case is an original case, such as Template T1 1005 or Case C1 1105 (block 2205). In one embodiment, the cases are provided in a plurality of messages from another system, such as the intelligent translation layer 210. In one embodiment, each of the plurality of messages contains a case or a modification to a case.

In one embodiment, the data management layer 230 creates a hierarchy of the parent/child relationships among the plurality of cases (block 2210), such as is shown in FIGS. 10-17. In one embodiment, the hierarchy is a list of the sort shown in FIGS. 15 and 17. In one embodiment, the hierarchy includes the use of linked lists to link parents with children and/or to link siblings.

In one embodiment, the data management layer 230 displays a subset of the plurality of cases in response to a search of the plurality of cases (block 2215). In one embodiment, displaying a subset of the plurality of cases includes displaying the subset of the plurality of cases in such a way that differences between each of the subset of the plurality of cases can be identified, such as is shown in FIG. 19. In one embodiment, displaying a subset of the plurality of cases includes displaying the subset of the plurality of cases in such a way that the parent/child hierarchy among the subset of the plurality of cases is shown, such as is shown in FIGS. 18, 19, and 20. In one embodiment, displaying a subset of the plurality of cases includes identifying the subset of the plurality of cases using a query. In one embodiment, displaying a subset of the plurality of cases includes displaying the subset of the plurality of cases hierarchically following the parent/child hierarchy. In one embodiment, displaying a subset of the plurality of cases includes displaying a difference between two of the cases in the subset of the plurality of cases, such as is shown in FIG. 21. In one embodiment, displaying a difference between two of the cases in the subset of the plurality of cases comprises performing an affinity analysis between the two cases.

In one embodiment, the data management layer 230 allows a user to select a smaller subset of the plurality of cases as a chosen model for an environment in which an oil field is to be drilled (block 2220). In one embodiment, the smaller subset of the plurality of cases is a single case. In one embodiment, the smaller subset of the plurality of case is more than one case; i.e., one case being used for one part of a reservoir and another case being used with another part of the same reservoir.

In one embodiment, the chosen model is used to plan the drilling of the oil well to produce a drilling plan (block 2225). In one embodiment, the drilling plan is used to drill the oil well (block 2230).

In one embodiment, the data management layer 230 associates with a case the output data produced by the software system when the case is provided to the software system as an input, such as output files 120.

The system 205 and the data management layer 230, in particular, are not limited to use in planning the drilling of an oil well. They can be used in other oil/gas field development scenarios, such as configuring a surface pipeline network for a field with multiple wells, optimizing the size of compressors on the wells or in the pipeline, optimizing capacity of gas processing plants to treat produced gas, calibrating the reinjection fraction of gas or produced water, etc. Further, they can be used in other situations in which it is useful to track the evolution of test data submitted to a software system and the resulting output data, such as weather prediction, traffic modeling, computer network optimization, etc.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   a computer system recording a plurality of cases, each case comprising: a set of input data; and
   an identification of a parent case from which the input data in a child case was copied, the identification of the parent case creating a parent/child relationship between the child case and the parent case, wherein the parent case and the child case are among the plurality of cases and wherein there is a difference between an element of the input data for the child case and a corresponding element of the input data for the parent case;
   the computer system creating a hierarchy of the parent/child relationships among the plurality of cases;
   the computer system displaying a subset of the plurality of cases including the parent case, the child case, and a link between the parent case and the child case in response to a search of the plurality of cases;
   the computer system, upon being prompted by selection of the link between the parent case and the child case, displaying a measured distance between the parent case and the child case, wherein the measured distance between the parent case and the child case incorporates the difference between the element of the input data for the child case and the corresponding element of the input data for the parent case;
   selecting a smaller subset of the plurality of cases as a chosen model for an environment in which an activity is to be performed;
   planning a performance of the activity using the chosen model to produce an activity plan; and
   performing the activity using the activity plan;
   wherein the computer displaying the measured distance between the parent case and the child case comprises performing an affinity analysis between the parent case and the child case.

2. The method of claim 1 wherein:
   the computer system receives a plurality of messages, each message including a case from the plurality of cases.

3. The method of claim 1 wherein:
   the computer system displaying a subset of the plurality of cases comprises displaying the subset of the plurality of cases in such a way that differences between each of the subset of the plurality of cases can be identified.

4. The method of claim 1 wherein:
   the computer system displaying a subset of the plurality of cases comprises displaying the subset of the plurality of cases in such a way that the parent/child hierarchy among the subset of the plurality of cases is shown.

5. The method of claim 1 further comprising:
   the computer system associating with a case the output data produced by the software system when the case is provided to the software system as an input.

6. The method of claim 1 wherein:
   displaying a subset of the plurality of cases comprising identifying the subset of the plurality of cases using a query.

7. The method of claim 1 wherein:
   displaying a subset of the plurality of cases comprises displaying the subset of the plurality of cases hierarchically following the parent/child hierarchy.

8. The method of claim 1 wherein:
   displaying a subset of the plurality of cases comprises displaying a measured distance between two of the cases in the subset of the plurality of cases.

9. A computer program, stored in a non-transitory computer-readable medium, the program comprising executable instructions that cause a computer to:
   record a plurality of cases, each case being used with a software system, a version of the software system being the same for each case, each case comprising:
   a set of input data; and
   an identification of a parent case from which the input data in a child case was copied, the identification of the parent case creating a parent/child relationship between the child case and the parent case, wherein the parent case and the child case are among the plurality of cases and wherein there is a difference between an element of the input data for the child case and a corresponding element of the input data for the parent case;
   create a hierarchy of the parent/child relationships among the plurality of cases; and display a subset of the plurality of cases including the parent case, the child case, and a link between the parent case and the child case in response to a search of the plurality of cases; and
   display a measured distance between the parent case and the child case, upon being prompted by selection of the link between the parent case and the child case, wherein the measured distance between the parent case and the child case incorporates the difference between the element of the input data for the child case and the corresponding element of the input data for the parent case;
   select a smaller subset of the plurality of cases as a chosen model for an environment in which an activity is to be performed;
   plan a performance of the activity using the chosen model to produce an activity plan; and
   perform the activity using the activity plan;
   wherein, when displaying the measured distance between the parent case and the child case, the computer performs an affinity analysis between the parent case and the child case.

10. The computer program of claim 9 further comprising executable instructions that cause the computer to:
    receive a plurality of messages, each message including a case from the plurality of cases.

11. The computer program of claim 9 wherein, when displaying the subset of the plurality of cases, the computer:
    displays the subset of the plurality of cases in such a way that differences between each of the subset of the plurality of cases can be identified.

12. The computer program of claim 9 wherein, when displaying the subset of the plurality of cases, the computer:
    displays the subset of the plurality of cases in such a way that the parent/child hierarchy among the subset of the plurality of cases is shown.

13. The computer program of claim 9 further comprising executable instructions that cause the computer to:
    associate with a case the output data produced by the software system when the case is provided to the software system as an input.

14. The computer program of claim 9 wherein, when displaying the subset of the plurality of cases, the computer:
    identifies the subset of the plurality of cases using a query.

15. The computer program of claim 9 wherein, when displaying the subset of the plurality of cases, the computer:

displays the subset of the plurality of cases hierarchically following the parent/child hierarchy.

16. The computer program of claim 9 wherein, when displaying the subset of the plurality of cases, the computer:
    displays a measured distance between two of the cases in the subset of the plurality of cases.

* * * * *

UNITED STATES PATENT AND TRADEMARK OFFICE
CERTIFICATE OF CORRECTION

PATENT NO. : 9,904,697 B2  
APPLICATION NO. : 14/388337  
DATED : February 27, 2018  
INVENTOR(S) : Amit Kumar and Sheldon Gorell Page 1 of 1

It is certified that error appears in the above-identified patent and that said Letters Patent is hereby corrected as shown below:

On the Title Page

Item (73) Assignee "Halliburton Energy Services, Houston, TX (US)" corrected to be "Landmark Graphics Corporation, Houston, TX (US)".

Signed and Sealed this  
Twenty-ninth Day of January, 2019

Andrei Iancu  
*Director of the United States Patent and Trademark Office*